United States Patent
Rigaud et al.

(10) Patent No.: US 9,719,712 B2
(45) Date of Patent: Aug. 1, 2017

(54) DEVICE AND METHOD FOR THE CONTINUOUS THERMOCHEMICAL PRODUCTION OF COLD

(71) Applicant: COLDWAY, Pia (FR)

(72) Inventors: Laurent Rigaud, Pia (FR); Francis Kindbeiter, Pia (FR)

(73) Assignee: COLDWAY, Pia (FR)

( * ) Notice: Subject to any disclaimer, the term of this patent is extended or adjusted under 35 U.S.C. 154(b) by 152 days.

(21) Appl. No.: 14/391,037

(22) PCT Filed: Apr. 30, 2013

(86) PCT No.: PCT/FR2013/050951
§ 371 (c)(1),
(2) Date: Oct. 7, 2014

(87) PCT Pub. No.: WO2013/164539
PCT Pub. Date: Nov. 7, 2013

(65) Prior Publication Data
US 2015/0068220 A1    Mar. 12, 2015

(30) Foreign Application Priority Data

May 3, 2012 (FR) ...................................... 12 01285

(51) Int. Cl.
*F25D 5/00* (2006.01)
*F25B 17/08* (2006.01)
(Continued)

(52) U.S. Cl.
CPC ............. *F25D 5/00* (2013.01); *B60N 2/3065* (2013.01); *B60N 2/366* (2013.01); *F25B 17/083* (2013.01)

(58) Field of Classification Search
CPC .......... F25D 5/00; F25B 17/083; F25B 30/04; F60N 2/3065; B60N 2/366; B60N 2/3065
See application file for complete search history.

(56) References Cited

U.S. PATENT DOCUMENTS

| 5,024,064 A   | 6/1991  | Yonezawa et al. |
| 5,083,607 A * | 1/1992  | Lebrun ................... F25B 17/08 165/104.12 |
| 5,478,545 A * | 12/1995 | Bougard ................... C01F 5/00 423/308 |

FOREIGN PATENT DOCUMENTS

| DE | 34 08 193 A1 | 9/1985 |
| FR | 2 643 704 A1 | 8/1990 |

(Continued)

OTHER PUBLICATIONS

International Search Report for PCT/FR2013/050951 dated Sep. 12, 2013.

*Primary Examiner* — Emmanuel Duke
(74) *Attorney, Agent, or Firm* — Sughrue Mion, PLLC

(57) ABSTRACT

A system and a thermochemical method for the production of cold, that uses a reactive device having a reactor or a chamber for storing a reactive product that can absorb a gas. The reactive product and the gas are such that, when they are exposed to one another, they undergo a reaction resulting in absorption of the gas by the reactive product and, conversely, they undergo a reaction involving the desorption of the gas absorbed by the reactive product as a result of heat applied to the reactive product when it absorbed the gas. The system has two substantially identical reactive devices wherein when the reactor of one reactive device is operating in the absorption cycle, the reactor of the other is operating in the desorption cycle. The system has a mechanism for determining the progress rate of the thermochemical reaction.

18 Claims, 2 Drawing Sheets

Figure 1:
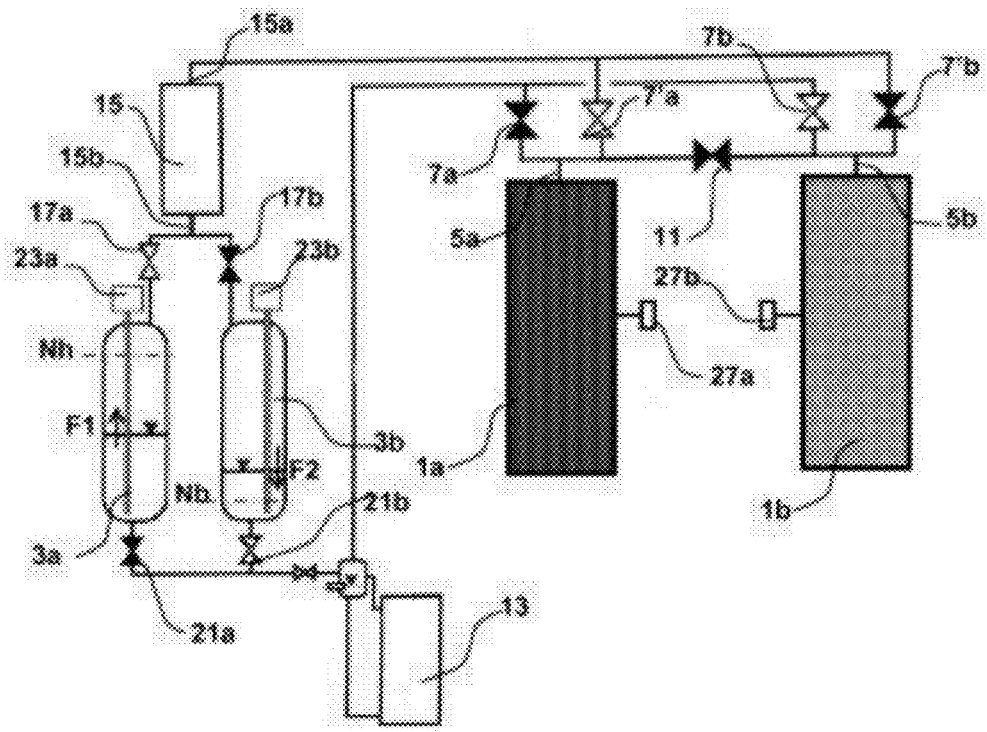

(51) Int. Cl.
*B60N 2/30* (2006.01)
*B60N 2/36* (2006.01)

(56) References Cited

FOREIGN PATENT DOCUMENTS

| | | | | |
|---|---|---|---|---|
| FR | 2985003 A1 | * | 6/2013 | ............ F25B 29/006 |
| JP | GB 2252615 A | * | 8/1992 | ............ F17C 13/026 |
| WO | 97/49958 A1 | | 12/1997 | |
| WO | 2005/108880 A1 | | 11/2005 | |
| WO | 2009/153245 A2 | | 12/2009 | |

* cited by examiner

DEVICE AND METHOD FOR THE CONTINUOUS THERMOCHEMICAL PRODUCTION OF COLD

CROSS REFERENCE TO RELATED APPLICATIONS

This application is a National Stage of International Application No. PCT/FR2013/050951 filed Apr. 30, 2013, claiming priority based on French Patent Application No. 12/01285 filed May 3, 2012, the contents of all of which are incorporated herein by reference in their entirety.

The present invention concerns a device and method for the thermochemical production of cold, and more precisely a device and method capable of producing cold in a controlled and quasi-continuous manner.

Systems are known that exploit the properties of a reversible and strongly exothermic thermochemical reaction during which a reactive product, such as certain salts and particularly calcium chloride or barium chloride, absorbs an appropriate gas such as ammonia in particular. The reversible nature of this reaction makes it possible, once the reaction is ended, to recover the initial gas by heating the salts so that the cycle can be repeated.

This property has been exploited in cold production systems in which the thermochemical system is placed in controlled communication with a reservoir containing the gas in liquid phase. When the two enclosures are placed in communication, the liquid gas contained in the reservoir is vaporized; this absorbs a certain amount of heat, cooling the reservoir, and this gas is absorbed by the reactive product thus generating the aforementioned chemical reaction, so that the reactor is the source of a release of heat. Once the reaction is ended, if the product contained in the reactor is heated, the gas absorbed in the reactive product is released and is then condensed in the reservoir.

It is understandable that devices of this type do not function continuously, because during the regeneration phase of the reagent, they are not of course in a cold producing state.

Proposed in patent applications WO 2009/153245, WO 2005/108880, and WO 97/49958 are heat pumps functioning with adsorption reactive devices, that is, without chemical reaction, which are coupled together in order to operate in opposite phases, so that when one of the reactors of one reactive device is operating in adsorption, the reactor of the other reactive device is operating in desorption. However, such systems are very different from the system according to the invention, which implements a true thermochemical reaction and which is far more efficient.

A purpose of the present invention is therefore to propose a device and a method for the thermochemical production of cold that is totally controlled and is capable of functioning continuously or quasi-continuously.

An object of the present invention is therefore a system for the thermochemical production of cold, of the type implementing at least one reactive device comprising a reactor, or enclosure for storage of a reactive product capable of absorbing a gas, the reactive product and the gas being such that, when they are placed in the presence of each other a reaction occurs resulting in the absorption of the gas by the reactive product, and in the reverse, a desorption reaction occurs of the gas absorbed by the reactive product under the effect of heat applied to the reactive product when said reactive product has absorbed the gas, said system comprising two substantially identical reactive devices disposed such as to have opposing operating cycles, so that when the reactor of one of them is operating in absorption, the reactor of the other one is operating in desorption, characterized in that it comprises means for determining the rate of progress of said thermochemical reaction.

Such a measurement is particularly advantageous in that knowing the rate of progress of the thermochemical reaction makes it possible to know the energy reserve remaining in the thermochemical system at any moment, and particularly before the end of each operating phase.

Preferably a condenser and an evaporator will be disposed between each reactor and each reservoir. According to the invention the condenser and/or the evaporator will be common to both reactors.

In order to control the rate of progress of the reaction, (i.e. the ratio of the quantity of gas absorbed in the reactor to the total quantity of gas that the reactor can absorb), the reservoirs can be provided with means suitable for measuring the quantity of liquefied gas present in each of them, particularly by measuring the quantity of gas that enters and/or leaves each of them or by measuring, by means of level sensors, the level of liquefied gas in each of them.

The system according to the invention will further comprise connection means, particularly at the end of each cycle, suitable for isolating the two reactors from the other elements of the system and to connect them to each other, so as to ensure a transfer of the gas from one reactor to the other reactor. These connection means will preferably be composed of solenoid valves controlled by programmable electronic means, particularly a microcontroller.

An object of the present invention is also a thermochemical method of producing cold of the type implementing at least one reactive device composed of a reactor containing a reactive product capable of absorbing a gas contained in the reservoir capable of being placed in communication with a condenser and an evaporator, said reactive product and the gas being such that, when they are in the presence of each other a thermochemical reaction occurs resulting in the absorption of the gas by the reactive product, and in the reverse, a desorption reaction occurs of the gas absorbed by the reactive product under the effect of heat applied to said reactive product when said reactive product has absorbed the gas, wherein two reactive devices are used that are made to operate in opposite phase so that, when the reactor of one of them is operating in absorption, the reactor of the other one is operating in desorption, characterized in that it comprises means of controlling the rate of progress of said thermochemical reaction.

The method according to the invention may advantageously comprise a step during which the quantity of liquefied gas present in the reservoirs is measured, particularly by measuring the quantity of liquefied gas that enters and/or leaves said reservoirs.

Said method may also comprise a step consisting of measuring the levels of the liquefied gas contained in the reservoirs and stopping the process when the level of liquid in the reservoir associated with the reactor during absorption reaches a lower limit and the level of liquid in the reservoir associated with the reactor during desorption reaches an upper limit.

According to the invention, the lower limit of the level sensor of one reservoir will be adjusted so that, when the liquefied gas reaches that level, the rate of progress of the reaction of the associated reactor is at its desired maximum rate of progress.

Moreover, said upper limit of the level sensor will be adjusted so that when the liquefied gas reaches that level, the rate of progress of the reaction of the associated reactor is at its desired minimum rate of progress.

According to the invention, if one of the reservoirs reaches its threshold level more quickly than the other, priority will be given to the one that has reached the lower level. More specifically, when the first threshold level reached by one reservoir is a low level, priority will be given to the reactor associated with that reservoir, and it will be isolated from the evaporator while waiting for the other reservoir to reach its upper level in order to interrupt the process by closing the valve communicating said reservoir with the condenser.

When the first threshold level reached by one reservoir is an upper level, the process will be continued until the other reservoir has reached the lower level.

Once the process has stopped, the communication of the two reactors will be controlled and maintained until the pressures therein are equalized.

Figure 2:
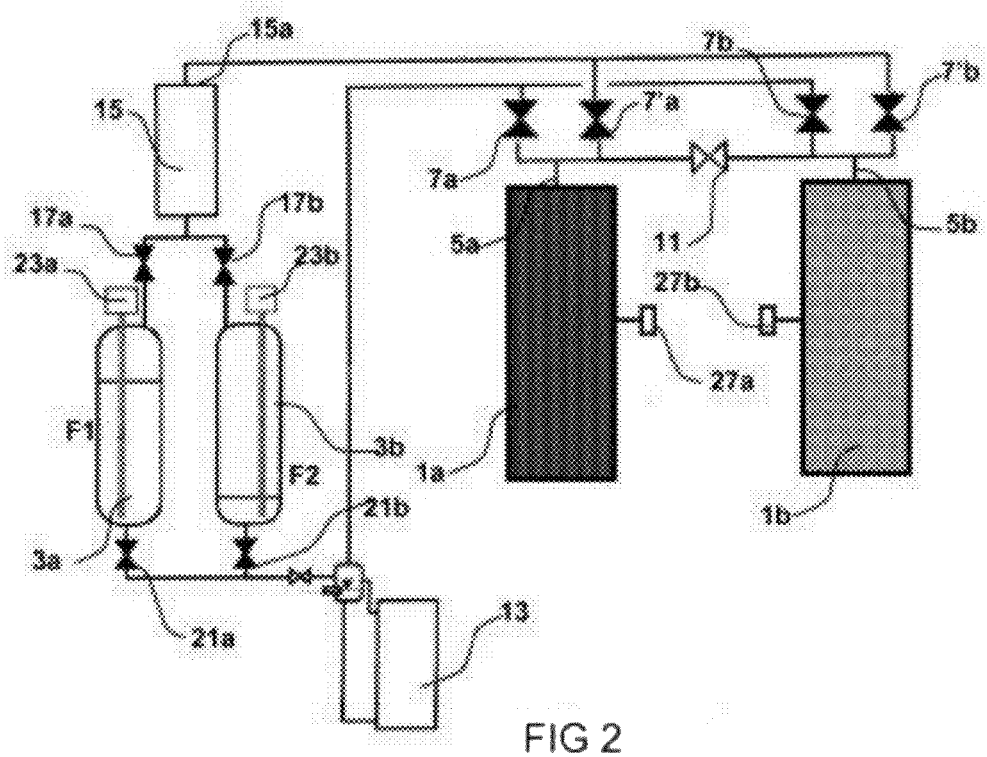
Figure 3:
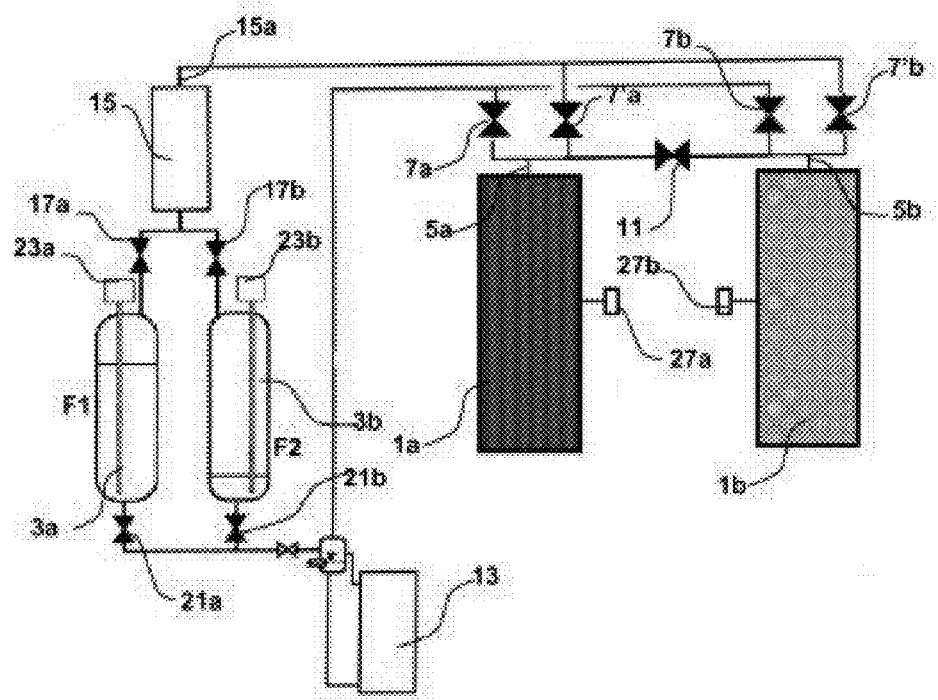
Figure 4:
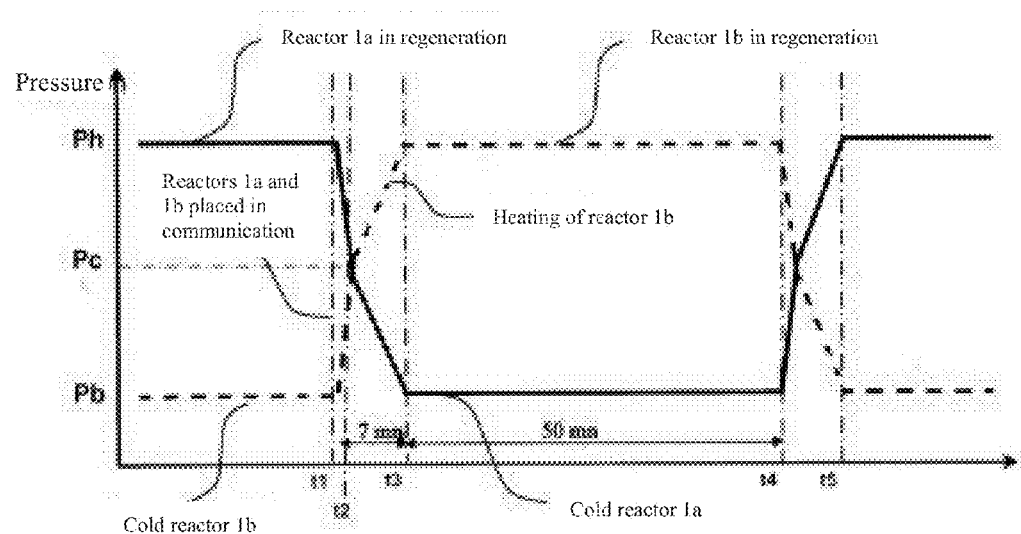

Described below is a non-limiting example of one embodiment of the present invention, with reference to the appended drawing in which:

FIG. 1 is a schematic representation of a system according to the invention during the process wherein one reactor operates in absorption, the other reactor operates in desorption, FIG. 2 is a schematic representation of the system represented in FIG. 1 after interruption of the process and in a step of placing the two reactors in communication, FIG. 3 is a schematic representation of the system represented in FIGS. 1 and 2 in a step of placing the two reactors under operating pressure, FIG. 4 is a graph representing the variation of the pressure in each of the two reactors during one operating cycle.

The thermochemical system that is represented schematically in FIGS. 1 to 3 essentially comprises two reactors 1*a* and 1*b* that contain a reactive product, for example in particular barium chloride or calcium chloride, and two reservoirs 3*a* and 3*b* that contain a specific liquid gas capable of reacting with the reactive product in a reaction as explained hereinafter, and which in particular can be the ammonia.

In a known manner, the reactive product and the specific gas are such that the reactive product is capable, by an exothermic thermochemical reaction, of absorbing the gas and then of restoring it by reverse thermochemical reaction, when the reactive product is heated.

The respective intakes 5*a* and 5*b* of the reactors 1*a* and 1*b* are connected to a first intake of two solenoid valves disposed in parallel, i.e. one solenoid valve 7*a* and one solenoid valve 7'*a* for the reactor 1*a* and one solenoid valve 7*b* and one solenoid valve 7'*b* for the reactor 1*b*. Moreover, a solenoid valve 11 connects the two intakes 5*a* and 5*b*.

The second intake of the solenoid valve 7*a* and the second intake of the solenoid valve 7*b* are connected to each other and to an evaporator 13, while the second intake of the solenoid valve 7'*a* and the second intake of the solenoid valve 7'*b* are connected to each other and to the intake 15*a* of a condenser 15. The outlet 15*b* of said condenser is connected to a first intake of two solenoid valves in parallel, respectively 17*a* and 17*b*, and the second intake of each of them is respectively connected to an intake of two respective reservoirs 3*a* and 3*b*. The outlet of each of the reservoirs 3*a* and 3*b* is connected, via the respective solenoid valves 21*a* and 21*b*, to the evaporator 13.

The operation of the system and particularly the opening and closing of the solenoid valves is controlled by control means, particularly a microcontroller not shown in the drawing.

The operation of the system is described in the following example in which the reactor 1*a* is considered to be in desorption mode (regeneration) and the reactor 1*b* in absorption mode (cold production). Such a process is represented in FIG. 1, in which the solenoid valves, which are placed in the closed position by the microcontroller, are represented in black.

In a known manner, to regenerate the reactive product contained in the reactor 1*a*, said reactor is heated for example by means of an electrical resistance, which results in the release of the gas absorbed by the reactive product, i.e. the ammonia, which passes through the solenoid valve 7'*a*, which is in the open position, in order to be condensed in the condenser 15, and through the solenoid valve 17*a*, which is in the open position, reaching the reservoir 3*a* in which the level increases as represented by the arrow F1.

At the same time the reactor 1*b* is in absorption mode (cold production) and, to that end, is connected to the evaporator 13 through the solenoid valve 7*b*, which is in the open position, and the reservoir 3*b* is connected to the evaporator through the solenoid valve 21*b* which is in the open position. Thus the liquid level in the reservoir 3*b* decreases as represented by the arrow F2.

It can be seen that the efficiency of the thermochemical system according to the invention depends on the rate of progress of the reaction $X_{Max}$ at the end of absorption and of the rate of progress of the reaction $X_{Min}$ at the end of desorption. It can also be seen that these rates of progress of the reaction depend on the application concerned. According to the invention, means are implemented that make it possible to control [sic] It is therefore important to be able to measure the rates of progress of the reaction X of each of the reactors.

Thus, in a first variant of embodiment these two rates of progress of the reaction are controlled by controlling the levels of liquefied gas inside the reservoirs 3*a* and 3*b*. To that end, said reservoirs are provided with liquid level measuring probes, respectively 23*a* and 23*b*, which make it possible to define for each of the reservoirs 3*a*, 3*b* an upper-level threshold $N_h$ and a lower-level threshold $N_b$.

Thus, in the present embodiment, and during the phase represented in FIG. 1 in which the reactor 1*b* is in absorption, the sensor 23*b* of the reservoir 3*b* is adjusted so that when the level of the liquefied gas reaches its lower level $N_b$, the rate of progress of the reaction of the reactor 1*b* is equal to the maximum desired rate of progress of the reaction, i.e. $X_{Max}$.

Moreover, at the same time the reactor 1*a* is in desorption and the reservoir 3*a* is filled with liquefied gas, and the sensor 23*a* thereof is adjusted so that when the level of liquefied gas reaches its upper level $N_h$, the rate of progress of the reaction of the reactor 1*a* is equal to the minimum desired rate of progress of the reaction $X_{Min}$.

Under these conditions and according to the invention the operating phase is stopped when the upper threshold $N_h$ and lower threshold $N_b$ values are reached.

More specifically, if one of the reservoirs reaches a threshold value first (which of course occurs in most cases), the indication of the lower level is first taken into account.

Thus, if it is the reservoir that is associated with the reactor that is in absorption (i.e. the reservoir 3*b* in this example) that first reaches the threshold level, in this instance the lower level $N_b$, then the evaporator 13 is isolated by closing the solenoid valve 21b while waiting for the desorption reaction of the other reactor, here the reactor 1a, to end, which is determined when the level of the reservoir associated with it, here the reservoir 3a, reaches its threshold level, i.e. its upper level $N_h$. The solenoid valve 17a is then closed, and this operating phase is then ended.

However, if it is the reactor that is in desorption, here the reactor 1a, the associated reservoir of which, here the reservoir 3a, first reaches its threshold level, i.e. the upper level $N_h$, the desorption is allowed to continue until the other reservoir, here the reservoir 3b, associated with the reactor 1b, reaches its threshold level, here the lower threshold $N_b$. The solenoid valves 21b and 17a are then closed. This operating phase is then ended.

In a second variant of embodiment of the invention, the rate of progress of the reaction of each of the reactors 1a and 1b is controlled by means capable of measuring the quantity of liquefied gas that enters and/or leaves the reservoirs 3a and 3b.

In another interesting embodiment of the present invention, represented in FIGS. 2 and 4, when the aforementioned operating phase has ended, the reactors 1a and 1b of the evaporator 13 and the condenser 15 are isolated by closing the valves 7'a and 7b, then the two reactors 1a and 1b are placed in communication at the time t1 by opening the solenoid valve 11.

The two reactors 1a and 1b are left in communication until they reach a common pressure $P_c$ at the time t2; their connection is then interrupted by closing the solenoid valve 11, as represented in FIGS. 3 and 4. To that end, each of the reactors 1a and 1b includes a pressure sensor respectively 27a, 27b, or preferably means of differential measurement of the pressures in the two reactors 1a and 1b.

As represented in FIG. 4, when the pressure in the reactor 1a reaches the low operating pressure Pb at the time t3, the operation of the system is reversed by opening the solenoid valves 7a, 7'b and 17b, so the operating phase of the system is reversed from the preceding one and now the reactor 1a operates in absorption mode (cold production) and the reactor 1b operates in desorption mode (regeneration).

Placing these two reactors in communication at the end of each of the active phases, by transferring the gas from the high-pressure reactor into the low-pressure reactor, makes it possible to shorten the time needed for the intermediate phases of increasing and decreasing pressure of these reactors.

The time lost between two half-cycles of cold production is therefore decreased and at the same time the continuous operation of the system is improved.

The invention claimed is:

1. A thermochemical system for the production of cold, comprising:
    a first reactive device and a second reactive device, said first reactive device comprising a first reactor and said second reactive device comprising a second reactor, each of said first reactor and said second reactor containing a reactive product; and
    a first reservoir and a second reservoir, each of said first reservoir and said second reservoir containing a gas;
    said reactive product and said gas being such that, when placed in the presence of each other a thermochemical gas absorption reaction occurs resulting in the absorption of the gas by the reactive product, and gas desorption reaction occurs when heat is applied to the reactive product when said reactive product has absorbed the gas, said thermochemical gas absorption reaction having a rate of progress, the first and second reactive devices being disposed to operate in opposite phases, so that when the reactor of the first reactive device is operating in absorption, the reactor of the second reactive device is operating in desorption, wherein the thermochemical system comprises means for determining the rate of progress of said thermochemical gas absorption reaction.

2. The thermochemical system for the production of cold according to claim 1, wherein each of the first reservoir and the second reservoir is capable of measuring the quantity of liquefied gas contained in the first reservoir and the second reservoir, respectively.

3. The thermochemical system for the production of cold according to claim 2, wherein each of the first reservoir and the second reservoir is provided with a level sensor of the capacitive type.

4. The thermochemical system for the production of cold according to claim 2, wherein each of the first reservoir and the second reservoir is capable of measuring the quantity of liquefied gas that enters and/or leaves each of the first reservoir and the second reservoir, respectively.

5. The thermochemical system for the production of cold according to claim 1, wherein each of the first reactor and the second reactor is provided with a pressure sensor.

6. The thermochemical system for the production of cold according to claim 1, further comprising a valve capable of isolating the first reactor and the second reactor, respectively, from other elements of the system and for connecting the first reactor and the second reactor to one another, so as to ensure a transfer of the gas between the first reactor and the second reactor; and wherein the connection means are coupled with the means for determining the rate of progress of the reaction.

7. The thermochemical system for the production of cold according to claim 6, wherein the connection means is coupled with the means for determining the rate of progress of the reaction so as to enable the communication of the first and second reactors when communication of one of the first and second reservoirs with the evaporator is closed and communication of the other of the first and second reservoirs with the condenser is closed.

8. A thermochemical method for the production using a system comprising a first reactive device and a second reactive device, the first reactive device comprising a first reactor and the second reactive device comprising a second reactor, each of the first reactor and the second reactor containing a reactive product; and a first reservoir and a second reservoir, each of the first reservoir and the second reservoir containing a gas, the reactive product capable of absorbing the gas, the system further comprising a condenser and an evaporator, the reservoir being able to communicate with the condenser and the evaporator, said reactive product and the gas being such that, when placed together a thermochemical gas absorption reaction occurs resulting in the absorption of the gas by the reactive product, and gas desorption reaction occurs when heat is applied to said reactive product when said reactive product has absorbed the gas, the thermochemical gas absorption reaction having a rate of progress, the rate of progress having a maximum value corresponding to a desired maximum rate of progress and a minimum value corresponding to a minimum desired rate of progress;
    operating the first and second reactive devices in opposite phase so that, when the thermochemical gas absorption reaction occurs in the first reactor, the gas desorption reaction occurs in the second reactor, wherein the rate of progress of said thermochemical gas absorption reaction is determined during the production of cold.

9. The thermochemical method for the production of cold according to claim 8, wherein the rate of progress is determined by measuring a quantity of liquefied gas in the first reservoir and the second reservoir, respectively.

10. The thermochemical method for the production of cold according to claim 9, comprising measuring the quantity of liquefied gas that enters into the first reservoir and the second reservoir, respectively.

11. The thermochemical method for the production of cold according to claim 9, wherein the production of cold is stopped when a level of liquid in the first reservoir or the second reservoir associated with the corresponding one of the first reactor and the second reactor in which the thermochemical gas absorption reaction occurs reaches a lower limit and the level of liquefied gas in the first reservoir or the second reservoir associated with the corresponding one of the first reactor and the second reactor in which the gas desorption occurs reaches an upper limit.

12. The thermochemical method for the production of cold according to claim 11, wherein each of the first reservoir and the second reservoir is provided with a first level sensor and a second level sensor, the first and second level sensors configured to measure a liquefied gas lower limit and a liquefied gas upper limit, respectively the lower limit of the first level sensor is adjusted so that, when the liquefied gas reaches the lower limit, the rate of progress of the thermochemical gas absorption reaction occurring in the first reactor corresponds to the maximum value.

13. The thermochemical method for the production of cold according to claim 12, wherein said upper limit of the second level sensor is adjusted so that when the liquefied gas reaches the upper limit, the rate of progress of the gas absorption reaction in the second corresponds to the minimum value.

14. The thermochemical method for the production of cold according to claim 11, wherein each of the first reservoir and the second reservoir is provided with a communication valve enabling the respective first or second reservoir to communicate with the condenser, and when the liquefied gas level reaches the lower limit in one of the first and second reservoirs, communication of the first or second reservoir in which the liquefied gas has reached a lower limit with the evaporator is closed while waiting for the upper limit to be reached in the other one of the first and second reservoirs in order to stop the production of cold by closing the corresponding communication valve.

15. The thermochemical method for the production of cold according to claim 11, wherein when the upper limit is reached in the first or second reservoir, the production of cold is stopped by closing communications between the reservoir in which the upper limit is reached and the evaporator and communication of the other reservoir with the condenser only after the lower level is reached in the other reservoir.

16. The thermochemical method for the production of cold according to claim 15, wherein once the production of cold is stopped, the first and second reactors are placed in communication.

17. The thermochemical method for the production of cold according to claim 16, the first and second reactors are maintained in communication until the gas pressure is the same in the first and second reactors.

18. The thermochemical method for the production of cold according to claim 17, wherein once the gas pressure is equal in said first and second reactors, communication between the first and second reactors is stopped until the gas pressure in the first or second reactor in which the gas desorption is occurring reaches a floor value.

* * * * *